United States Patent
Ibrahim et al.

(10) Patent No.: US 9,804,788 B2
(45) Date of Patent: Oct. 31, 2017

(54) METHOD AND APPARATUS FOR TRANSFERRING INFORMATION BETWEEN DIFFERENT STREAMING PROTOCOLS AT WIRE SPEED

(71) Applicant: NetApp, Inc., Sunnyvale, CA (US)

(72) Inventors: Rahim Ibrahim, Mountain View, CA (US); Nghiep Tran, San Jose, CA (US); Tuan Nguyen, San Jose, CA (US); Chan Ng, San Jose, CA (US); James L. Cihla, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 448 days.

(21) Appl. No.: 13/952,025

(22) Filed: Jul. 26, 2013

(65) Prior Publication Data
US 2013/0311690 A1 Nov. 21, 2013

Related U.S. Application Data

(63) Continuation of application No. 10/238,927, filed on Sep. 9, 2002, now abandoned.
(Continued)

(51) Int. Cl.
*G06F 3/06* (2006.01)
*G06F 12/0804* (2016.01)
(Continued)

(52) U.S. Cl.
CPC .......... *G06F 3/0613* (2013.01); *G06F 3/0655* (2013.01); *G06F 3/0673* (2013.01);
(Continued)

(58) Field of Classification Search
None
See application file for complete search history.

(56) References Cited

U.S. PATENT DOCUMENTS

| 4,347,608 A | 8/1982 | Appiano et al. |
| 4,641,302 A | 2/1987 | Miller |

(Continued)

FOREIGN PATENT DOCUMENTS

| CA | 2453900 A1 | 7/2005 |
| EP | 0 380 854 A2 | 8/1990 |

(Continued)

OTHER PUBLICATIONS

IBM, IBM Network Processor (IBM32NPR161EPXCAC133), Product Overview, Nov. 4, 1999, pp. 1-7.
(Continued)

*Primary Examiner* — Henry Tsai
*Assistant Examiner* — Christopher Bartels
(74) *Attorney, Agent, or Firm* — LeClairRyan, a Professional Corporation

(57) ABSTRACT

The present invention provides a mechanism for fast routing of data in a Storage Area Network. A protocol interface module (PIM) interfaces with outside networks and the storage devices, such as over fiber channel (FC). The PIM encapsulates received data into a streaming protocol, enabling storage processors to direct data to/from the appropriate physical disk in a similar manner to the directing of network messages over the Internet or other network.

34 Claims, 9 Drawing Sheets

Related U.S. Application Data

(60) Provisional application No. 60/317,817, filed on Sep. 7, 2001.

(51) Int. Cl.
*G06F 12/0813* (2016.01)
*G06F 12/0862* (2016.01)
*G06F 12/0866* (2016.01)
*G06F 12/1081* (2016.01)
*G06F 12/126* (2016.01)

(52) U.S. Cl.
CPC ...... *G06F 12/0804* (2013.01); *G06F 12/0813* (2013.01); *G06F 12/0862* (2013.01); *G06F 12/0866* (2013.01); *G06F 12/1081* (2013.01); *G06F 12/126* (2013.01); *G06F 2212/263* (2013.01)

(56) References Cited

U.S. PATENT DOCUMENTS

| | | |
|---|---|---|
| 5,455,834 A | 10/1995 | Chang et al. |
| 5,548,589 A * | 8/1996 | Jeon et al. ............. 370/399 |
| 5,621,885 A | 4/1997 | Del Vigna, Jr. |
| 5,651,002 A * | 7/1997 | Van Seters et al. ......... 370/392 |
| 5,655,140 A | 8/1997 | Haddock |
| 5,668,968 A | 9/1997 | Wu |
| 5,787,494 A | 7/1998 | DeLano et al. |
| 5,799,049 A | 8/1998 | McFarland et al. |
| 5,821,875 A * | 10/1998 | Lee et al. ............. 340/2.21 |
| 5,892,900 A | 4/1999 | Ginter et al. |
| 5,892,912 A * | 4/1999 | Suzuki et al. ........... 370/395.53 |
| 5,999,931 A | 12/1999 | Breitbart et al. |
| 6,016,558 A | 1/2000 | Seong et al. |
| 6,032,184 A | 2/2000 | Cogger et al. |
| 6,044,403 A | 3/2000 | Gersberg et al. |
| 6,052,738 A | 4/2000 | Muller et al. |
| 6,067,608 A | 5/2000 | Perry |
| 6,081,812 A | 6/2000 | Boggs et al. |
| 6,118,776 A | 9/2000 | Berman |
| 6,145,028 A | 11/2000 | Shank et al. |
| 6,148,414 A | 11/2000 | Brown et al. |
| 6,158,014 A | 12/2000 | Henson |
| 6,182,198 B1 | 1/2001 | Hubis et al. |
| 6,208,543 B1 | 3/2001 | Tupuri et al. |
| 6,247,077 B1 | 6/2001 | Muller et al. |
| 6,247,109 B1 | 6/2001 | Kleinsorge et al. |
| 6,256,748 B1 | 7/2001 | Pinson |
| 6,260,120 B1 | 7/2001 | Blumenau et al. |
| 6,289,376 B1 | 9/2001 | Taylor et al. |
| 6,295,575 B1 | 9/2001 | Blumenau et al. |
| 6,307,834 B1 | 10/2001 | Worster |
| 6,343,324 B1 | 1/2002 | Hubis et al. |
| 6,381,674 B2 | 4/2002 | DeKoning et al. |
| 6,400,730 B1 | 6/2002 | Latif et al. |
| 6,411,678 B1 | 6/2002 | Tomlinson, Jr. et al. |
| 6,421,711 B1 | 7/2002 | Blumenau et al. |
| 6,438,661 B1 | 8/2002 | Beardsley et al. |
| 6,438,707 B1 | 8/2002 | Ronstroem |
| 6,442,666 B1 | 8/2002 | Stracovsky |
| 6,453,404 B1 | 9/2002 | Bereznyi et al. |
| 6,457,098 B1 | 9/2002 | DeKoning et al. |
| 6,463,446 B1 | 10/2002 | Wollrath et al. |
| 6,536,037 B1 | 3/2003 | Guheen et al. |
| 6,571,358 B1 | 5/2003 | Culotta et al. |
| 6,587,879 B1 | 7/2003 | Reynolds |
| 6,615,166 B1 | 9/2003 | Guheen et al. |
| 6,636,239 B1 | 10/2003 | Arquie et al. |
| 6,640,278 B1 | 10/2003 | Nolan et al. |
| 6,654,747 B1 | 11/2003 | Van Huben et al. |
| 6,671,280 B1 | 12/2003 | Bass et al. |
| 6,754,853 B1 | 6/2004 | DeKoning et al. |
| 6,760,776 B1 | 7/2004 | Gallo et al. |
| 6,766,466 B1 | 7/2004 | Jibbe |
| 6,775,230 B1 | 8/2004 | Watanabe et al. |
| 6,799,255 B1 | 9/2004 | Blumenau et al. |
| 6,807,582 B1 | 10/2004 | Mueschenborn |
| 6,813,731 B2 | 11/2004 | Zahavi et al. |
| 6,834,214 B2 | 12/2004 | Davison et al. |
| 6,839,746 B1 | 1/2005 | Muthiyan et al. |
| 6,857,059 B2 | 2/2005 | Karpoff et al. |
| 6,865,737 B1 | 3/2005 | Lucas et al. |
| 6,876,656 B2 | 4/2005 | Brewer et al. |
| 6,877,011 B2 | 4/2005 | Jaskiewicz |
| 6,898,670 B2 | 5/2005 | Nahum |
| 6,947,931 B1 * | 9/2005 | Bass et al. |
| 7,076,652 B2 | 7/2006 | Ginter et al. |
| 7,145,898 B1 | 12/2006 | Elliott |
| 7,167,450 B1 | 1/2007 | Kato et al. |
| 7,203,730 B1 | 4/2007 | Meyer et al. |
| 7,239,650 B2 | 7/2007 | Rakib et al. |
| 7,330,892 B2 | 2/2008 | Ibrahim et al. |
| 7,428,540 B1 | 9/2008 | Coates et al. |
| 8,705,527 B1 * | 4/2014 | Addepalli ............ H04W 4/046 370/389 |
| 2001/0036165 A1 | 11/2001 | Suzuki |
| 2001/0047462 A1 | 11/2001 | Dimitroff et al. |
| 2001/0049773 A1 | 12/2001 | Bhavsar |
| 2001/0054112 A1 | 12/2001 | Nobakht et al. |
| 2002/0001307 A1 * | 1/2002 | Nguyen et al. ............. 370/386 |
| 2002/0010790 A1 | 1/2002 | Ellis et al. |
| 2002/0016912 A1 | 2/2002 | Johnson |
| 2002/0019958 A1 | 2/2002 | Cantwell et al. |
| 2002/0026558 A1 | 2/2002 | Reuter et al. |
| 2002/0042923 A1 * | 4/2002 | Asmussen ......... G06F 17/30017 725/92 |
| 2002/0044567 A1 | 4/2002 | Voit et al. |
| 2002/0046209 A1 | 4/2002 | De Bellis |
| 2002/0073257 A1 | 6/2002 | Beukema et al. |
| 2002/0103980 A1 | 8/2002 | Crockett et al. |
| 2002/0104039 A1 | 8/2002 | DeRolf et al. |
| 2002/0112113 A1 | 8/2002 | Karpoff et al. |
| 2002/0129339 A1 | 9/2002 | Callahan et al. |
| 2002/0156962 A1 | 10/2002 | Chopra et al. |
| 2002/0156984 A1 * | 10/2002 | Padovano ............. 711/148 |
| 2002/0156987 A1 | 10/2002 | Gajjar et al. |
| 2002/0161983 A1 | 10/2002 | Milos et al. |
| 2002/0169869 A1 | 11/2002 | Fainer et al. |
| 2002/0170004 A1 | 11/2002 | Parrett et al. |
| 2002/0194369 A1 | 12/2002 | Rawlins et al. |
| 2003/0002503 A1 | 1/2003 | Brewer et al. |
| 2003/0031197 A1 | 2/2003 | Schmidt |
| 2003/0037127 A1 | 2/2003 | Shah et al. |
| 2003/0084209 A1 | 5/2003 | Chadalapaka |
| 2003/0131182 A1 | 7/2003 | Kumar et al. |
| 2003/0140051 A1 | 7/2003 | Fujiwara et al. |
| 2003/0140193 A1 | 7/2003 | Acharya et al. |
| 2003/0149848 A1 | 8/2003 | Ibrahim et al. |
| 2003/0156603 A1 | 8/2003 | Rakib et al. |
| 2003/0172149 A1 | 9/2003 | Edsall et al. |
| 2003/0182501 A1 | 9/2003 | George et al. |
| 2003/0200548 A1 * | 10/2003 | Baran ............... H04L 29/06027 725/90 |
| 2003/0208525 A1 * | 11/2003 | Bannai et al. ............. 709/201 |
| 2003/0236945 A1 | 12/2003 | Nahum |
| 2004/0006572 A1 | 1/2004 | Hoshino et al. |
| 2004/0133634 A1 | 7/2004 | Luke et al. |
| 2004/0165588 A1 * | 8/2004 | Pandya ................... 370/389 |
| 2004/0210677 A1 | 10/2004 | Ravindran et al. |
| 2004/0230797 A1 * | 11/2004 | Ofek ................ G06F 21/14 713/168 |
| 2005/0033878 A1 | 2/2005 | Pangal et al. |
| 2005/0047334 A1 | 3/2005 | Paul et al. |
| 2005/0246504 A1 * | 11/2005 | Frey et al. ................ 711/150 |
| 2006/0010299 A1 * | 1/2006 | Zhang et al. .............. 711/162 |
| 2006/0288134 A1 | 12/2006 | Baker et al. |
| 2007/0239779 A1 * | 10/2007 | Hugill ............... G06F 17/30038 |

(56) References Cited

U.S. PATENT DOCUMENTS

2015/0187043 A1* 7/2015 Shebanow ............... G06T 1/60
　　　　　　　　　　　　　　　　　　　　　　345/543

FOREIGN PATENT DOCUMENTS

| EP | 1209569 A1 | 5/2002 |
|---|---|---|
| EP | 1480404 A2 | 11/2004 |
| WO | 03007154 A2 | 1/2003 |

OTHER PUBLICATIONS

Montague et al., Virtualizing the SAN, Morgan Keegan & Company, Inc., Jul. 5, 2000, pp. 1-20.
Agarwal, et al., "Enterprise Modeling using class and instance models," IEEE, 2000, pp. 336-343.
Anciano, et al., "UML Performance Data Model," Second International Workshop on Software and Performance WOSP 2000 Ottawa, Canada, Retrieved from the Internet: http://www.macs.hw.ac.uk/-pjbk/umlworkshop/, Sep. 17-20, 2000, pp. 1-36.
Anderseon D., et al., "Failure-Atomic File Access in an Interposed Network Storage System," Proceedings in High-performance Distributed Computing, 2000, pp. 157-164.
Ari I., et al., "SANBoost: Automated SAN-Level caching in storage area networks," 2004, 8 pages.
Brinkmann A., et al., "Realizing Multilevel Snapshots in Dynamically Changing Virtualized Storage Environments," Proceedings of the International Conference on Networking, International Conference on Systems, and Internatinal Conference on Mobile Communications and Learning Technologies, IEEE, 2006, 9 pages.
Dale D., "Storage Networking and the Data Center of the Future," Nov. 2000, pp. 1-5.
Derfler Jr., et al., "How Networks Work," Que, Millenium Edition, 2000, pp. 106-107.
FalconStor software, Application note, Optimizing Novell Netware Environments with Ipstor, 2002, pp. 1-4.
Golding R., et al., "Persistent Storage for Distributed Applications," ACM SIGOPS european workshop proceedings of the 8th, 1998, pp. 53-57.
Huang L., et al., "Multi-dimensional Storage Virtualization," Proceedings of the Joint International Conference on Measurement and Modelling of the Computer Systems, 2004, pp. 14-24.
Muller R., "Database Design for Smarties Using UML for Data Modeling," Morgan Kaufmann Publishers, 1999, pp. 1-268.
Naeve, et al., "Edutella: A P2P Networking Infrastructure Based on RDF," Dept. of Numerical Analysis and Computer Science, Royal Institute of Technology, Stockholm, Sweden, 2003, pp. 1-3.
Ou., "On Mapping between UMLand Entity-Relationship," CiteSeer, 1998, pp. 1-14.
Quatrani T., "Visual Modeling with Rational Rose and UML," Addison-Wesley, 1998, pp. 2-12, 14-18, 20-39, 42-61,64-74, 76-89, 92-104, 106-115, 118-129, 132-137, 140-156, 158-177.
Rajagopal M., et al., "RFC 2625: IP and ARP Over Fibre Channel," Jun. 1999, 59 pages.
SANRAD white paper: v-switch 3000-storage virtualization WP 001-04, 2003, pp. 1-24.
Selic B., et al. "Response to the OMG RFP for Schedulability, Performance, and Time," Real-Time OMG Submission Consortium, Sep. 1999, pp. 1-33.
Skogan, "UML as a Schema Language for XML based Data Interchange," Dept. of Informatics, University of Oslo, Norway, 1999, pp. 1-11.
Sugerman J., et al., "Virtualizing I/O Devices on VMware Workstation's Hosted Virtual Machine Monitor," Proceedings of the 2001 USENIX annual technical conference, Jun. 2001, 14 pages.
Uskahkipuro P., "UML Based performance Modeling of Object-Oriented Distributed Systems," SiteSeer, 1999, pp. 1-8.
WOSP2000, "Final Program," Second International Workshop on Software and Performance: WOSP2000—Chateau Laurier Hotel, Ottawa, Canada,Sep. 2000, pp. 1-12.

* cited by examiner

METHOD AND APPARATUS FOR TRANSFERRING INFORMATION BETWEEN DIFFERENT STREAMING PROTOCOLS AT WIRE SPEED

CROSS-REFERENCE TO RELATED APPLICATIONS

The present application is a continuation of co-pending, commonly assigned, patent application Ser. No. 10/238,927 entitled "METHOD AND APPARATUS FOR TRANSFERRING INFORMATION BETWEEN DIFFERENT STREAMING PROTOCOLS AT WIRE SPEED," filed Sep. 9, 2002, which in itself claims priority to U.S. Provisional Patent Application 60/317,817, entitled "METHOD AND APPARATUS FOR PROCESSING FIBRE CHANNEL FRAMES AT WIRE SPEED," filed Sep. 7, 2001 the disclosures of which are hereby incorporated herein by reference.

BACKGROUND OF THE INVENTION

The present invention relates to storage area networks (SAN), and in particular to virtual SANs.

Storage virtualization describes the process of representing, to a user, a number of discrete physical storage devices as a single storage pool having a single set of characteristics. For example, in a storage area network connecting host computers with storage devices, the user perceives a single block of disk space with a defined reliability (e.g., 100 GB at RAID 1), regardless of whether the data is stored on a single RAID 1 disk array or is split across multiple, separate disk arrays.

In the above situation, each host computer must be aware of the storage devices connected to the storage area network because each host computer manages the storage virtualization that is presented to its users. When the storage devices connected to the storage area network are modified (such as a new device being added or an existing device being removed), each host computer must be reconfigured to accommodate the modification. Such reconfiguration involves work by network administrators and ensures that changes in the network are not seamless.

FIG. 1 shows a schematic view of information transfer by a conventional storage area network. Specifically, conventional Storage Area Network (SAN) 20 comprises storage server 22 in communication with external data source 24 such as a minicomputer, and external data storage device 26 such as a disk array, through port 23 in communication with fibre channel (FC) controller 28.

Communication between FC controller 28 and CPU 30 of storage server 22 of SAN 20 shown in FIG. 1 takes place typically along a PCI bus 32. Conventionally, the transfer of data in and out of storage server 4 is performed utilizing a store-and-forward algorithm. Specifically, FC controller 28 sends and receives data directly to and from memory 34 of host server 22. Similarly, FC controller 28 forwards received commands to memory 34 of host server 22, interrupting operation of CPU 30 of host server 22 until all information has arrived.

Data handling techniques employed by the conventional storage area network shown in FIG. 1 offer certain disadvantages. One disadvantage of the configuration shown in FIG. 1 is the consumption of attention of the CPU of the storage server to manage operation of the FC processor. For example, TABLE 1 below lists a typical sequence of twelve steps 1-12 which occur when the FC controller responds to an FCP_CMND from a host requesting data.

TABLE 1

| Step# | Step |
|---|---|
| 1 | FCP_CMND frame arrives |
| 2 | Command arrives. Interrupt is generated. |
| 3 | CPU interrogates the interrupt cause (command). |
| 4 | CPU reads memory to examine the FCP_CMND |
| 5 | CPU allocates memory for a Write command OR wireless data to memory for a Read command. |
| 6 | CPU tells controller that buffers are available for processing. |
| 7 | Controller reads memory (data) and ships data out. |
| 8 | Transfer complete. Interrupt is generated. |
| 9 | CPU interrogates interrupt cause (transfer complete). |
| 10 | CPU writes status to memory. |
| 11 | CPU tells controller that the STATUS frame is in memory. |
| 12 | Controller reads memory (data) and ships data out. |

FIG. 1 shows this flow of interaction between a FC controller chip 28 and the host CPU 30. In this case the CPU is involved with at least three memory access steps as well as accessing the FC controller through the PCI bus at least four times. The FC controller itself has to access the memory at least three times.

Further compounding the problem, the FC controller generates an interrupt. This causes the CPU to take the penalty of processing interrupts, which is heavy since a stack has to be saved into memory. When the JO traffic from the FC controller is heavy, interrupts are generated frequently; and the CPU spends a lot of time just saving the contexts.

As the CPU handles all commands, commands requiring a lot of processing block the simpler RD and WR commands that are communicated much more frequently.

The PCI bus can only have a certain amount of load. This limits the number of devices that can sit on the bus. A PCI bridge 36 can help solve this problem, but this causes latency.

The CPU in this case usually runs a real time or general purpose operating system (OS). CPU cycles are shared between the OS and IO handling. Interrupts are frequently taken by the CPU for things such as timers or serial port traffic.

Frames are processed in a "store and forward" approach. The entire frame has to be in memory before the CPU is informed of it's arrival. This further detracts from the speed of operation of the system shown in FIG. 1, as each incoming frame must first be buffered and then retrieved in order for proper routing to occur.

Still another disadvantage of the conventional approach shown in FIG. 1 is complexity, as the processor must include sufficient memory capacity in the form of buffering hardware to store the necessary quantity of information.

Another disadvantage associated with the system shown in FIG. 1 is the bottleneck created by the single FC controller, which is allocated to both receive incoming information from external hosts, and to issue commands to retrieve data from the storage devices.

FIG. 2 shows an example of a conventional virtual storage system 60 which utilizes off-the-shelf PC hardware using general Operating Systems (OS). In the implementation shown in FIG. 2, there are two separate FC controllers 28a and 28b. FC controller 28a is in communication with storage device (INITIATOR) 26 through port 63a. FC controller 28b is in communication with Host (TARGET) 24 through port 63b.

A disadvantage of the conventional approach shown in FIG. 2, however, is that the two separate FC controllers 28a and 28b are now contending for access to memory 34, internal bus 32, and CPU 30. Both controllers 28a and 28b are also interrupting CPU 30 with work requests.

To preform virtualization, the CPU has to bind the Host that is sending the command with the LUN number in the command. The FC controller would send an identifier indicating which host sent the command. The CPU would then have to perform a hash lookup using the handle and the LUN number. The identifier used by the controller is usually a pointer to its internal device context.

With FC, the link may bounce. The FC controllers will then perform discovery again. This time however, a different identifier may be chosen by the FC controller for that same Host. The CPU would then have to modify its tables so that the correct binding will be established.

Given the disadvantages associated with conventional storage systems, embodiments of the present invention are directed toward improvements in these and other areas.

BRIEF SUMMARY OF THE INVENTION

The present invention provides a mechanism for fast routing of data in a Storage Area Network. A protocol interface module (PIM) interfaces the storage processors with outside networks and the storage devices, such as over fiber channel (FC). The PIM encapsulates received frames or just the payload of the frames into a streaming protocol, enabling storage processors to direct data to/from the appropriate physical disk in a similar manner to the directing of network messages over the Internet or other network.

In one embodiment, the storage processor is a network processor, with multiple, parallel protocol processors. In addition, a general purpose CPU is provided. The PIM inspects the incoming message, and inserts a frame type in the header. The storage processor uses a hardware classifier to read the frame type and, if it is a read or write operation, assign it to one of the protocol processors. Otherwise, all of the commands are sent to the general purpose CPU.

In one embodiment, the network processors handle the virtualization, first determining which VLUN from the host ID, LUN field and port. Information is then fed into a hardware tree search engine to determine the physical location of the data. The commands making up the read or write operation are then routed to the appropriate storage processor connected to the data storage itself (e.g., RAID controller).

To distribute tasks, the storage processor connected to the PIM need not do the virtualization and processing of storage commands itself. Rather, it could route some frames to another storage processor connected to a switch fabric for processing. The PIM receiving the original message places an identification of the appropriate storage processor, where it has previously been assigned, into the header of the frame. The PIM receives a frame of information including a header and a payload. The PIM rapidly inspects only the header of the received data frame in order to identify relevant contextual information. Based upon recognized contextual information, the PIM references a look up table to identify corresponding frame destination information. The PIM then generates a descriptor from the destination information, encapsulates the descriptor within a frame according to a streaming protocol, and forwards the encapsulated frame to the storage processor for routing to the appropriate destination. Use of the look up table in combination with the rapidly-discerned header context information avoids buffering of the entire incoming data frame, thereby enhancing speed and efficiency of information transfer.

In one embodiment, the internal protocol is packet over SONET (POS), and the SAN is connected to the host and to the storage controllers over fiber channel (FC). By using the PIMs to perform conversion from one protocol to the other, a common protocol, such as SCSI, can be used for all the storage processors, allowing for modularity regardless of the particular system design. Other outside connections than FC could be used, such as Ethernet, etc. The present invention thus provides many speed advantages, by doing certain operations in hardware, and doing others using network processors and performing the virtualization and storage (e.g., RAID) operations using a network, streaming protocol. A streaming protocol, such as POS, assumes the other side is ready to receive the data and streams it across, with any flow control being done in hardware as specified by the POS protocol. Additionally, separate paths are used for receive and transmit to achieve full duplex.

A fuller understanding of the present invention may be obtained by reference to the following drawings and related detailed description.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

System Overview

As described generally above, an embodiment of a storage area network in accordance with the present invention may include an interface processor configured to transfer information at wire speed between an external streaming protocol and an internal streaming protocol that is different from the external streaming protocol.

Figure 1:
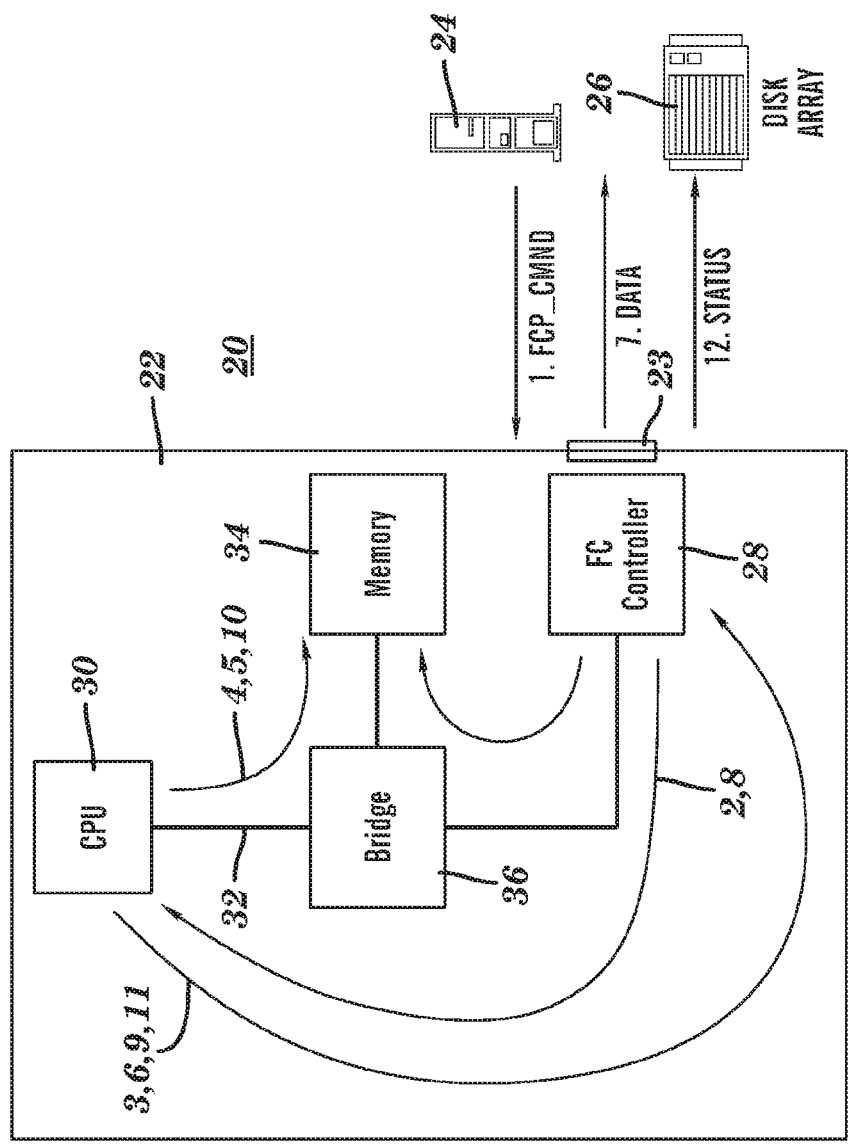
FIG. 1 is a simplified schematic view of one example of a conventional storage area network.
Figure 2:
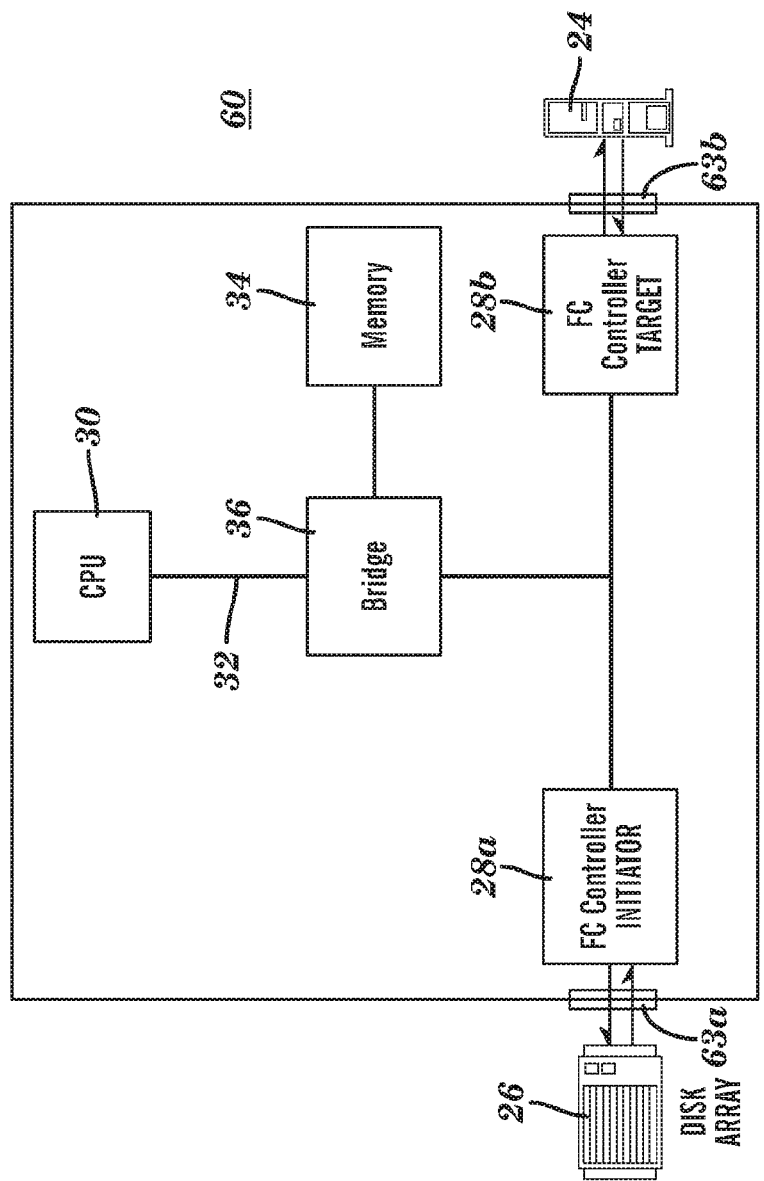
FIG. 2 is a simplified schematic view of another example of a conventional storage area network.
Figure 3:
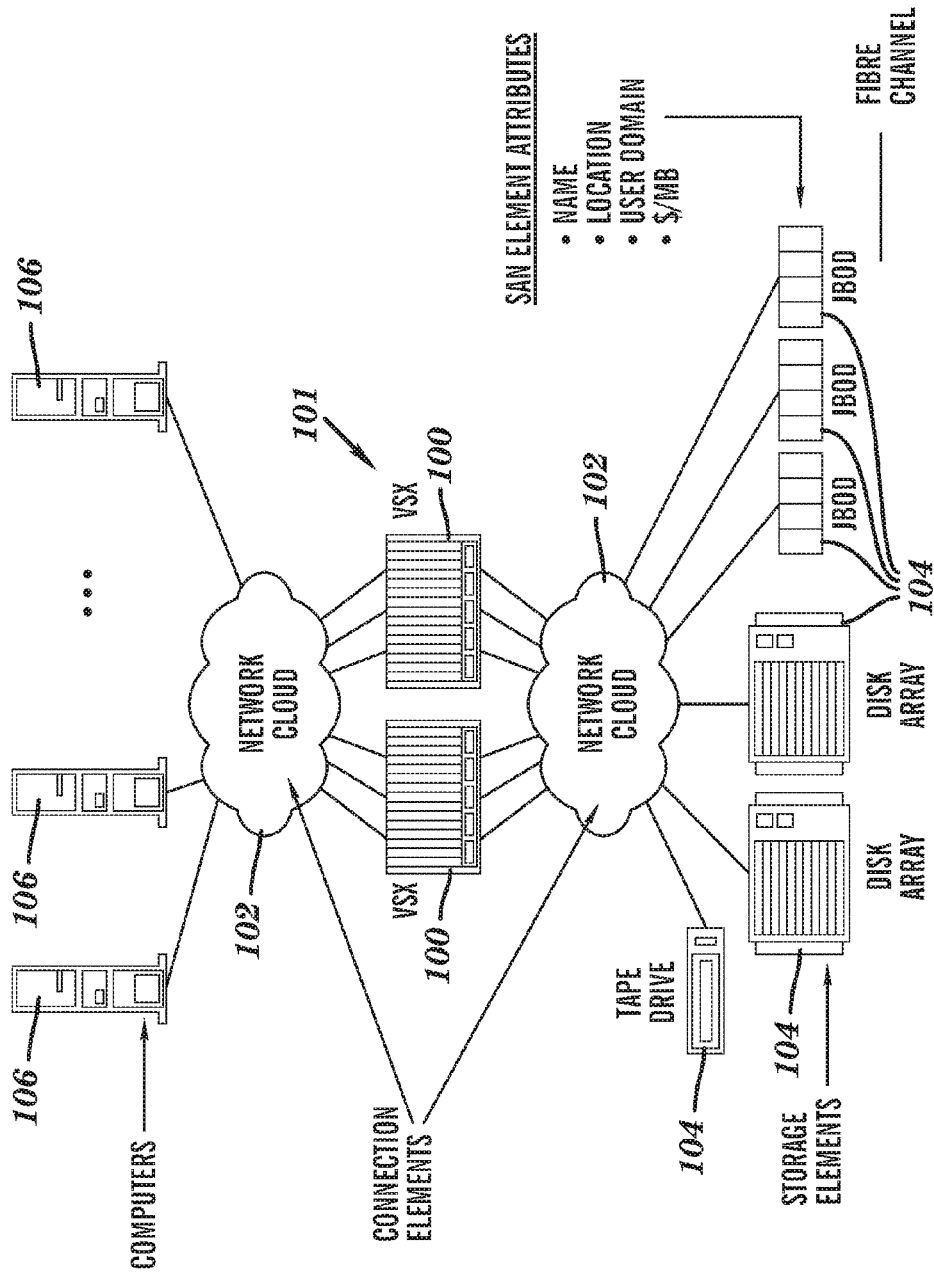
FIG. 3 is a simplified schematic view of one embodiment of a storage area network in accordance with the present invention.

FIG. 3 shows a storage server 100 according to an embodiment of the present invention. The figure shows a storage area network (SAN) 102, a number of physical storage devices 104, and a number of host computers 106.

The storage server 100 is also referred to as a Virtual Storage Exchange (VSX) or Confluence Virtual Storage Server (CVSS). The storage server 100 provides storage virtualization to servers in a homogeneous as well as a heterogeneous environment, providing a solution to large data centers, ISPs, SSPs, and ASPs in the area of network storage.

The SAN 102 can be any type of computer network. It is referred to as a storage area network in the present application because that is its relevant function with respect to the embodiments of the present invention. In an embodiment of the present invention, the SAN 102 is a Fibre Channel network, the host computers 106 and the storage devices 102 are configured to communicate with a Fibre Channel network, and the storage server 100 is also configured to communicate with a Fibre Channel network. Thus, the storage server 100 can be easily added to an existing SAN.

The physical storage devices 104 include tape drives, disk arrays, JBODs ("just a bunch of disks"), or other types of data storage devices. The physical storage devices 104 can be connected directly to the host computers 106 via the SAN 102 or can be indirectly connected to the host computers 106 via the SAN 102 and the storage server 100. As discussed above in the Background, management of storage virtualization is burdensome when the storage devices 104 are directly connected to the host computers 106 via the SAN 102. The present invention improves management of storage virtualization by using the storage server 100 to indirectly connect the storage devices 104 to the host computers 106.

The host computers 106 can be servers or stand-alone computers. The host computers 106 can be directly connected to the SAN 102 or indirectly connected via a switch, router, or other communication link.

Figure 4:
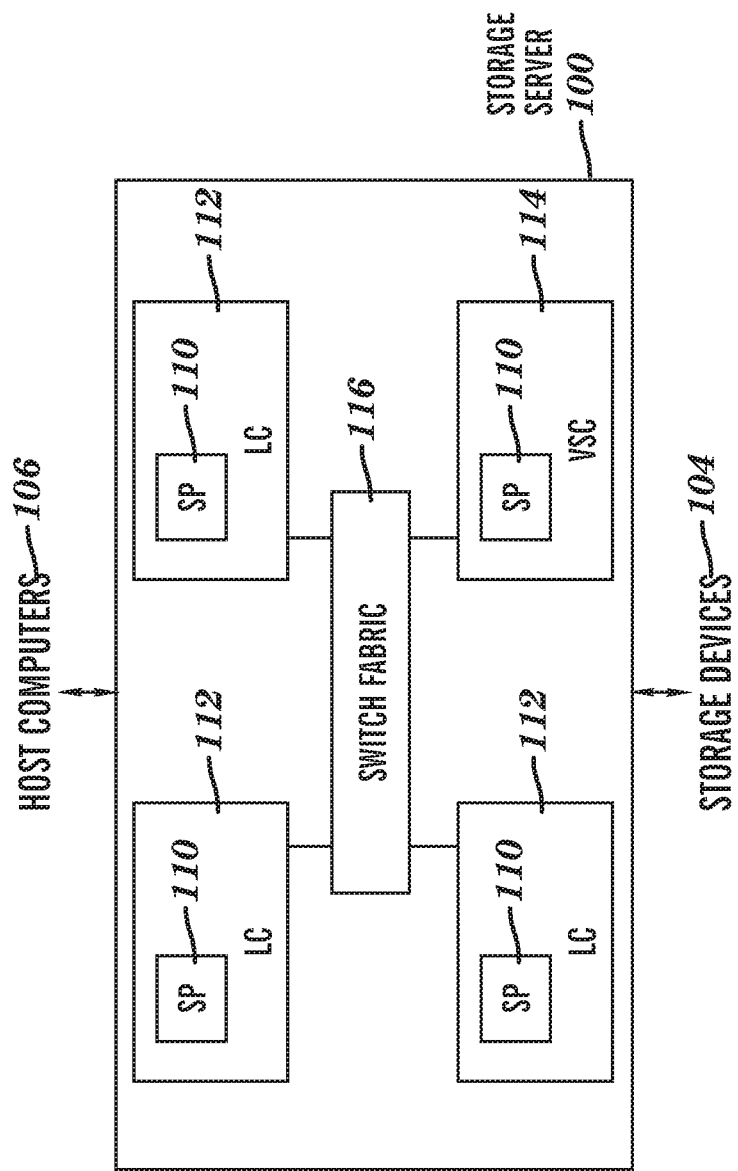
FIG. 4 is a block diagram of the storage server of FIG. 3.

FIG. 4 is a block diagram of the storage server 100 showing the hardware components related to embodiments of the present invention, including a storage processor (SP) 110, a line card (LC) 112, a virtual server card (VSC) 114, and a switch fabric 116.

The storage server 100 may include one or more storage processors 110. The storage processors 110 process the storage commands and data to be stored as information flows between the host computers 106 and the storage devices 104. One or more of the storage processors 110 may be included on each line card 112. The storage server 100 includes space for numerous line cards 112, so the capabilities of the storage server 100 can be modularly increased by adding more line cards 112 or more storage processors 110. Each storage processor 110 is associated with one or more ports of the storage server 100.

The storage server 100 may include one or more virtual server cards 114. The virtual server cards control the operation of the storage server 100 and control the line cards 112, which perform the actual work of transferring commands and data.

The switch fabric 116 connects the storage processors 110. The switch fabric switches information received at one port to another port of the storage server 100. For example, when a host computer 106 wants to read data stored on the storage area network 102, its request is processed by the storage processor 110 associated with the port associated with that host computer 106. That storage processor 110 is referred to as the upstream storage processor 110. The upstream storage processor 110 communicates with a downstream storage processor 110 associated with the port associated with the storage device 104 storing the data to be read, via the switch fabric 116. Then the switch fabric 116 transfers the data read from the storage device to the host computer 106, via the downstream and upstream storage processors 110.

Figure 5:
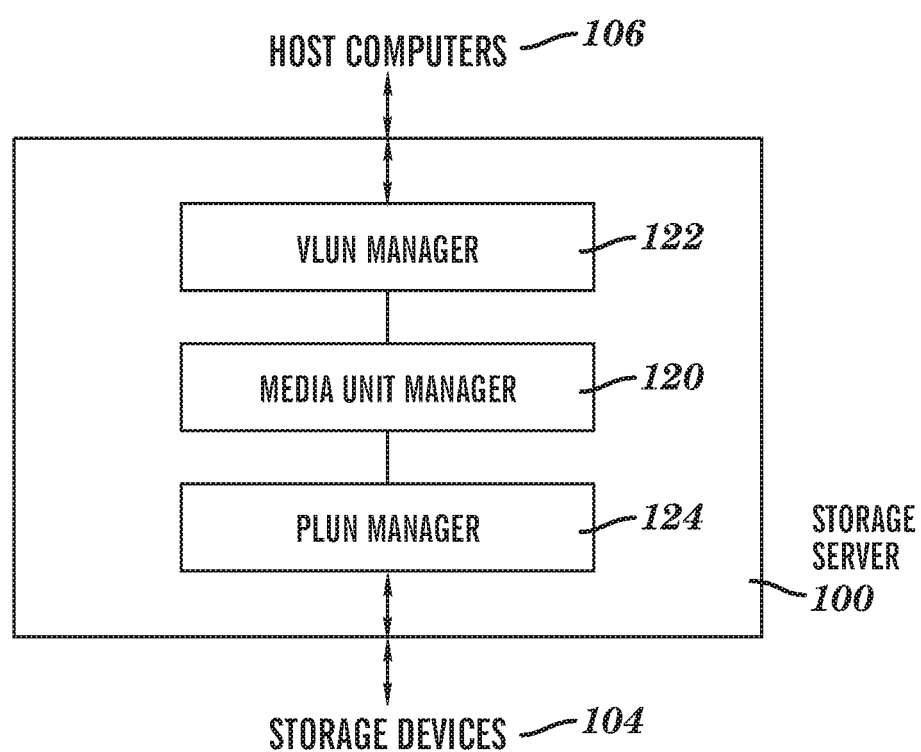
FIG. 5 is a block diagram of the software modules of a storage server.

FIG. 5 is a block diagram of the storage server 100 showing the functionality relevant to embodiments of the present invention. The functions of the storage server 100 may be implemented by one or more processors that execute processing according to one or more computer programs, microcode segments, hardware structures, or combinations thereof. The functions relevant to the present invention are the media unit (MU) manager 120, the virtual logical unit number (virtual LUN or VLUN) manager 122, and the physical logical unit number (physical LUN or PLUN) manager 124.

Additional details of the storage server 100 are provided in other applications assigned to the present assignee and filed on Feb. 13, 2002 that claim the benefit from the above-noted Provisional Application No. 60/268,694 and are hereby incorporated herein by reference as follows: U.S. nonprovisional patent application Ser. No. 10/076,855 entitled "Storage Virtualization and Storage Management to Provide Higher Level Storage Services"; U.S. nonprovisional patent application Ser. No. 10/076,909 entitled "Method and Apparatus for Identifying Storage Devices"; U.S. nonprovisional patent application Ser. No. 10/077,482 entitled "System and Method for Policy Based Storage Provisioning and Management"; U.S. nonprovisional patent application Ser. No. 10/077,181 entitled "Virtual Data Center"; U.S. nonprovisional patent application Ser. No. 10/076,906 entitled "Failover Processing in a Storage System"; U.S. nonprovisional patent application Ser. No. 10/077,199 entitled "RAID at Wire Speed", and U.S. nonprovisional patent application Ser. No. 10/076,878 entitled "Method for Device Security in a Heterogeneous Storage Network Environment".

The PLUN manager 124 manages data and command transfer to and from the storage devices 104. Each storage device 104 may have associated therewith a PLUN that is used for identifying each particular storage device 104.

The VLUN manager 122 manages data and command transfer to and from the host computers 106. Each host computer 106 may be associated with one or more VLUNs. Each VLUN represents a virtual address space (e.g., gigabytes of storage) with defined attributes (e.g., performance parameters, reliability level, etc.). As such, each host computer 106 exchanges data and commands with the storage server 100 with reference to a particular VLUN.

Abstract block-storage addressing is achieved via a data structure known as a media unit (MU). The MU manager 120 basically translates between VLUNs and PLUNs. The MU manager 120 is responsible for managing the address space of all the storage devices 104 (physical LUNs) connected to the storage server 100. The MU manager 120 also manages the address space of the storage constructs built within the storage server 100, including slices, concatenations, RAID0 (stripes) and RAID1 (mirrors).

The MU manager 120 uses an abstract block-storage addressing technique that enables address spaces to be treated in a logical manner, regardless of the underlying storage constructs or physical LUNs. These logical address spaces can be combined together into more complex and feature rich storage constructs, which are also treated simply as abstract block-storage address spaces.

Used in conjunction with a virtual LUN, these logical address spaces can be configured to appear as LUNs on a multi-ported storage device. This process of presenting physical LUNs as logical address spaces on virtual devices is referred to as storage virtualization.

FIG. 5 shows the relationship between physical media units and the other services. The PLUN manager 124 manages PLUNs, the MU manager 120 manages media units, and the VLUN manager 122 manages VLUNs.

In addition, FIG. 5 shows the relationships between PLUNs, media units, and VLUNs. Generally, a PLUN directly corresponds to a storage device, such as a disk or a disk array. Such a direct one-to-one is relationship generally shown in the following figures. However, a PLUN can also be associated with a portion of the storage device. Multiple PLUNs can be associated with different portions of a single storage device.

Each physical media unit (first-level media unit) generally directly corresponds to a single, respective PLUN. Each VLUN is generally associated with a single, respective media unit.

FC Frame Processing Description

Figure 6:
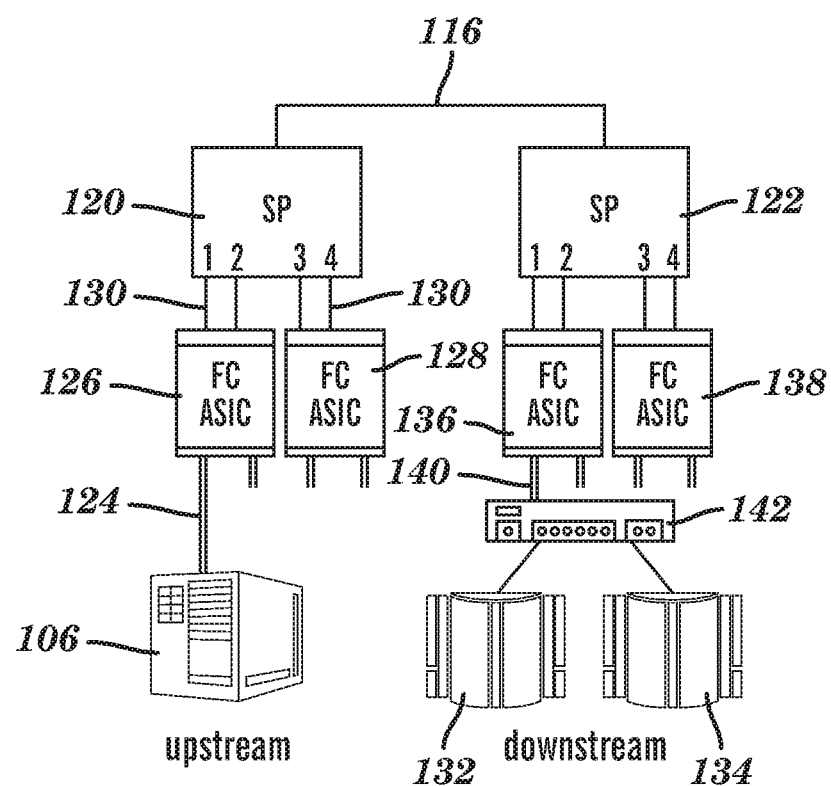
FIG. 6 is a block diagram of upstream and downstream storage processors in an embodiment in accordance with the present invention.

FIG. 6 is a block diagram illustrating a simplified view of the SAN in FIG. 4, showing only a single upstream SP 120 and a single downstream SP 122, interconnected by switch fabric 116. In an example process, host 106 transfers data over a connection 124 (such as fiber channel) to a PIM 126, which is a fibre channel ASIC (FC ASIC) in this embodiment. A second FC ASIC 128 is available for connection to other hosts. Host 106 may be a computer itself, or a network card connected to a network of computers.

The PIM, or FC ASIC, communicates with storage processor 120 over interface lines 130. This interface uses a standard internal protocol which is a streaming, packetized protocol, preferably packet over SONET (POS). The upstream storage processor 120 then performs a virtualization and sends the data to be read or written to the appropriate downstream SP 122 connected to the actual disks 132, 134, on which the data resides. The connection to these disks is through additional FC ASICs 136, 138. These then connect through a separate FC port 140 to a storage controller 142, such as a Redundant Array of Independent Disks (RAID) controller. Connections 124 and 140 could be a protocol other than FC. Examples of other protocols than FC include, but are not limited to, iSCSI, InfiniBand, iFCP, and FCIP. These different streaming protocols may utilize different frame formats.

Figure 7:
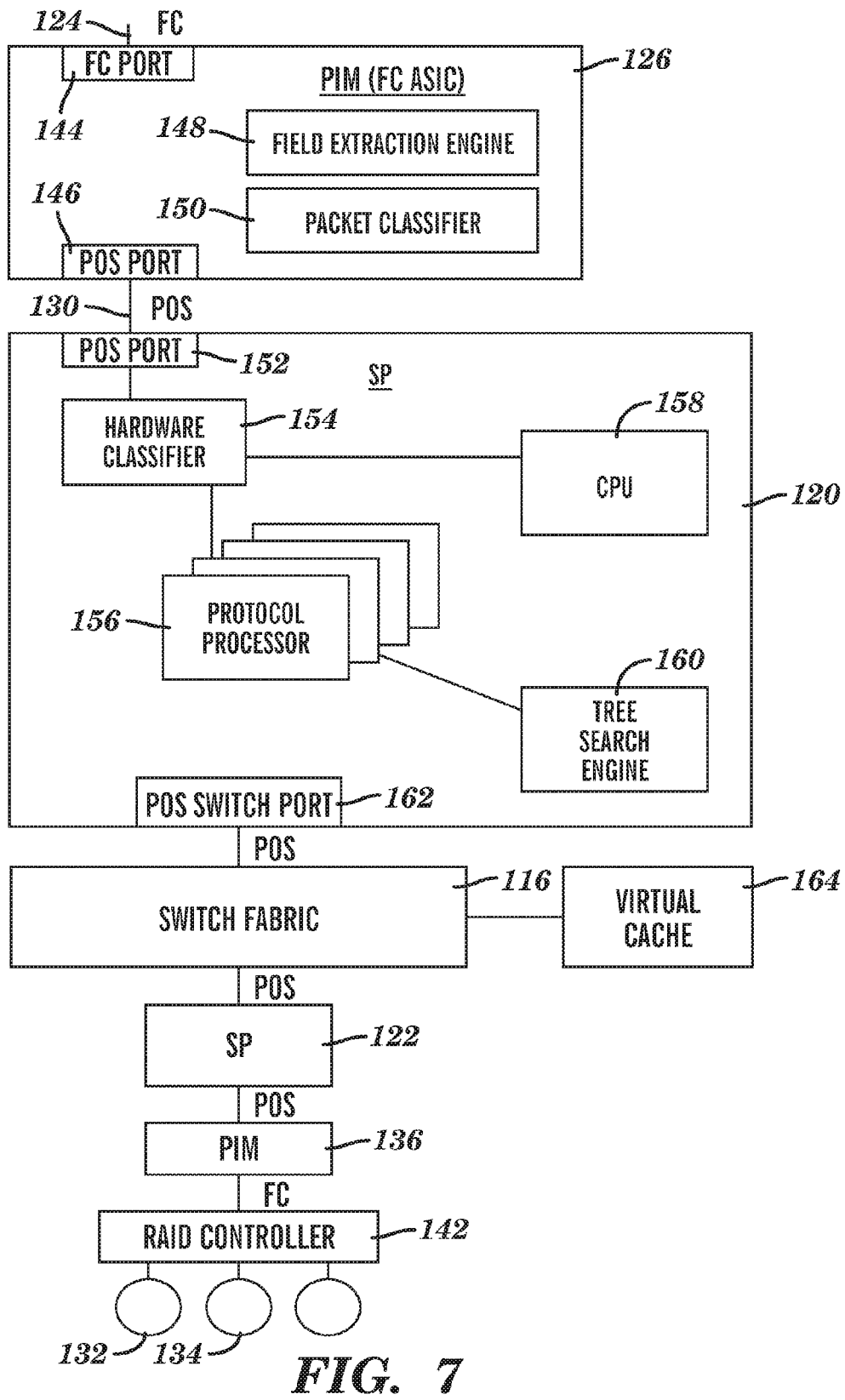
FIG. 7 is a block diagram of the PIM and SP architecture according to an embodiment of the invention.

FIG. 7 illustrates in more detail aspects of the PIM and SP of FIG. 6. PIM or FC ASIC includes a fiber channel port 144 on one side and a POS port 146 on the other. Internal to the ASIC is a field extraction engine 148. This inspects the incoming FC frame, and determines what type of action is required, such as read, write, status, or other command. A packet classifier 150 then inserts a frame type code into a Point-to-Point-Protocol (PPP) field encapsulating the FC frame in a POS frame.

When SP 120 receives the encapsulated POS frame through a POS port 152, a hardware classifier 154 examines the frame type and determines where to send it. A read or write command is sent to one of multiple protocol processors 156. Other commands are provided to a general purpose CPU 158. Protocol processor 156 determines which VLUN is associated with the frame using the host ID, LUN field and the port associated with the frame. Once the VLUN is determined, a tree search engine 160 is invoked to determine the physical LUN locations for routing purposes. The read or write operation can then be provided through a switch port 162, using the POS protocol, to switch fabric 116. In one embodiment, the read or write operation is first directed to a virtual cache 164. For further description of the virtual cache, see copending application entitled, "Storage Area Network Data Cache", U.S. patent application Ser. No. 10/234,560, filed Sep. 6, 2002, incorporated herein by reference. If the data is not found in the cache, it is then routed to the indicated downstream SP 122.

In one embodiment, the SP 120 connected to PIM 126 need not be the one which performs the storage functions. Rather, the storage functions could be distributed to any SP connected to switch fabric 116. The SP that gets assigned will have a routing tag, which is provided back through SP 120 to PIM 126, so that the next associated frame can have the appropriate routing tag attached by PIM 126. For a fuller description of the routing tags and their implementation, reference should be made to copending application "Silicon-Based Storage Virtualization Server," Ser. No. 10/077,696, filed Feb. 13, 2002. Reference should also be made to copending application "Data Mover Mechanism to Achieve SAN RAID to Wire Speed", U.S. patent application Ser. No. 10/224,618, filed Aug. 19, 2002. The disclosures of the above-referenced applications are hereby incorporated herein by reference.

In one embodiment, storage processor 128 is a network processor, such as that made by IBM, the IBM MP4GS3. (E.g., the IBM 32NPR161EPXCAC133). This network processor includes 16 protocol processors and an embedded Power PC processor.

The POS connections shown in FIG. 7 are full duplex, with hardware flow control. This way, the PIM can assume that the SP is ready to receive the frame, relying on hardware flow control to kick in if the SP cannot receive it.

The FC ASIC sends the server WWN instead of a device context identifier. The WWN is a worldwide unique identifier. It is issued by IEEE. This way, when a link bounce occurs, the tables do not have to be reprogrammed since the WWN of the server is the same.

Figure 8:
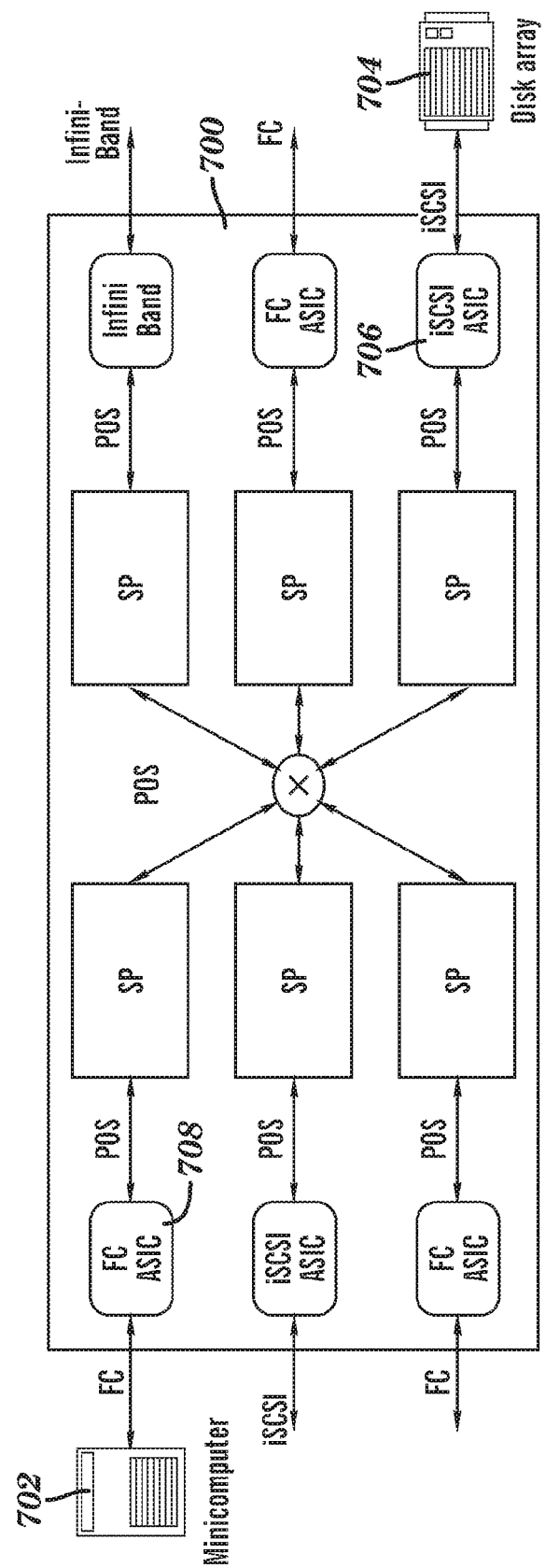
FIG. 8 is a block diagram of an embodiment of in accordance with the present invention with a switch fabric and multiple external protocols.

FIG. 8 shows an alternate embodiment, wherein external minicomputer 702 communicates information utilizing the FC streaming protocol, while external disk array storage device 704 communicates information utilizing the iSCSI streaming protocol. Internally, information is communicated between storage processors 706 and 708 of VSX 700 utilizing a streaming protocol (POS) that is different from either FC or iSCSI.

Figure 9:
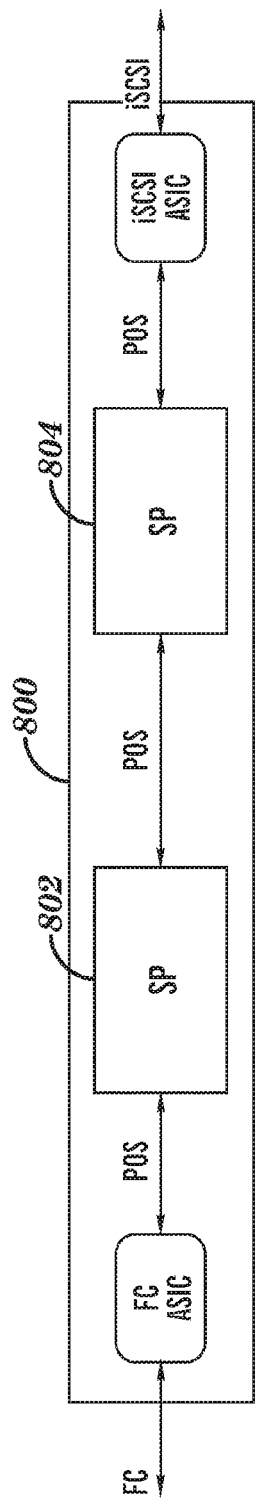
FIG. 9 is a block diagram of an embodiment in accordance with the present invention without a switch fabric.

While FIG. 6 shows an embodiment of an apparatus in accordance with the present invention wherein multiple storage processors as connected to each other through a switch fabric, this is also not required. Storage processors of the VSX could be connected back-to-back and the apparatus and method would fall within the scope of the present invention. This is shown in FIG. 9, wherein storage processors 802 and 804 of VSX 800 are connected back-to-back.

Figure 10:
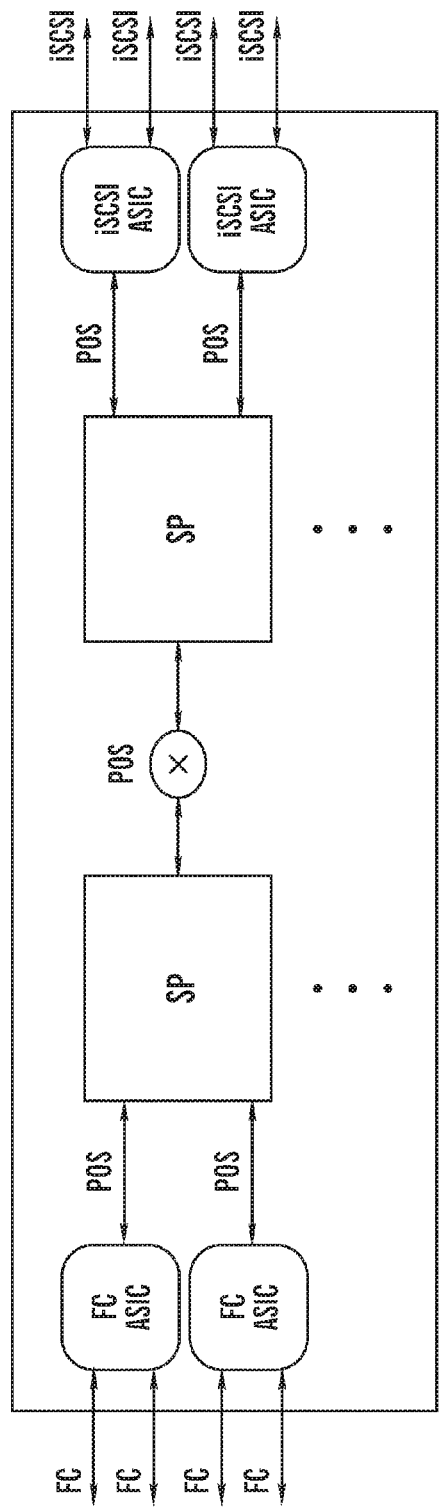
FIG. 10 is a block diagram of an embodiment in accordance with the present invention with multiple ports per SP.

In addition, while FIG. 6 shows an embodiment of an apparatus in accordance with the present invention wherein each interface processor is in communication with a single storage processor, this is also not required. In actual implementation, each storage processor has sufficient processing power and bandwidth to handle multiple external and internal ports as shown in FIG. 10.

The approaches just described offer a number of advantages over the "store and forward" algorithm that is conventionally employed to transfer information. One advantage of embodiments of the present invention is enhanced speed of transfer. Specifically, the use of cut through mode enables packets or frames of data to be routed from source ports to destination ports even before the whole frame of information has arrived.

A second advantage of embodiments in accordance with the present invention is reduced complexity. Specifically, the elimination of the need to store and forward each incoming frame significantly reduces the data buffering or caching hardware required.

A third advantage of embodiments in accordance with the present invention is efficiency. Specifically, the internal switch fabric enables distributed process, since control and data information packets can be routed from any SP to any SP at wire speed. This is especially efficient for clustering of SPs in order to allow sharing of processing power. It also facilitates alternate path access during error recovery.

A fourth advantage of embodiments in accordance with the present invention is scalability. Specifically, the routing systems and methods just described are scalable because the addition of ports also adds processing power in the form of storage processors.

A fifth advantage of embodiments in accordance with the present invention is flexibility. For example, each SP of the VSX can be programmed to handle transfer between different varieties of streaming protocols. Moreover, the capacity to utilize such an additional streaming protocol can be readily incorporated into an apparatus in accordance with the present invention by changing a new protocol PIM with the new protocol on the external interface, and changing the internal protocol on the SP interface.

Framing

The header of a frame may include a variety of forms of control information that provide a context for the frame. One type of control information is the source ID of the frame, which identifies the initiator of the frame (i.e. the network address of the Initiator) to the receiver. In the frame format associated with the FC streaming protocol, the source ID is called "SID".

A second type of control information is the frame originator's job ID or handle, which identifies the specific job or operation in progress among the plurality of concurrent operations. The job ID or handle allows an incoming frame to be associated with a particular job or operation in progress. In the frame format associated with the FC streaming protocol, the job ID or handle is called "OXID".

A third type of control information present in the frame header is the destination ID, which identifies the final receiver of the frame (i.e. the network address of the Destination.) In the frame format associated with the FC streaming protocol, the destination ID is called "DID".

A fourth type of control information is the receiver's job ID or handle. The frame receiver's job ID or handle identifies the specific job or operation in progress among the plurality of concurrent operations, so an incoming frame can be identified with which job or operation. In the frame format associated with the FC streaming protocol, the receivers job ID or handle is called "RXID".

To summarize, for the FC streaming protocol, the SID and OXID control information together identify the specific job on the originator side. The DID and RXID control information identify the corresponding job ID on the target side.

A fifth type of control information describes the frame type. Examples of frame types include but are not limited to Command Frames, Data Frames, Status Frames, and Acknowledgment Frames.

The content of the payload depends on the frame type identified in the header. For example, the payload of a Command Frame contains the command code and its parameters. The payload of a Data Frame contains data.

The integrity of the contents of the entire frame may be ensured by such mechanisms as CRC or Check-Sum.

The FC ASIC provides the following features to assist in the SP processing of the frames.

It provides the FCP frame type in a code inserted into the PPP protocol field. The types that should be identified by the FC ASIC are:
  FCP_CMND—0x2B00,
  FCP_STATUS—0x2B01,
  FCP_DATA—0x2B03,
  RDY/ACK—0x2B02, and
  NON SCSI, CONTROL, EVENT_REPORT—0X2B04.
There will be a subtype to distinguish the three types.

When sending data frames to the SP, each frame is numbered sequentially. This is a simple way for the SP to see if there are missing data frames. This is the frame_id in the TAGS field. Some frames take longer to process than others. With a hardware "tagging" facility, the frames can be kept in order of arrival at the ingress side even though the firmware has completed processing and has queued the frame to the fabric. The hardware "tagging" will ensure that the frame is sent to the fabric in the order received.

The SP will send the FC ASIC an SP handle and routing information. The SP handle will be sent along with the FC ASIC handle. The FC ASIC will use the latest handle and routing information sent by the SP. The routing information may change during the command duration. The routing information contains a remote IoCB lookup, TB number, target DMU/DSU. This mechanism is used to minimize the time to look for an IoCB before shipping the data frame.

The FC ASIC provides a CRC over the data portion of the data frame. This is in addition to the CRC added by the POS Interface. This CRC is used to validate the integrity of data from the upstream SP to the downstream SP. This CRC is referred to as DTCRC.

The FC ASIC validates the DTCRC provided in a data frame. This is in addition to the CRC applied by the POS Interface. Since the headers will change, the value of the DTCRC remains intact.

The FC ASIC informs the SP if it receives a data frame with an invalid DTCRC. This way, the problem can be reported back to the host.

When the FC ASIC sends the SP a WRITE command, it needs to wait for a RDY acknowledgment from the SP informing it of the number of bytes the SP is willing to take in. The SP will send more RDY frames when the byte count has finished. This support is needed in order to support requests that span disks. The SP will only send an RDY up to the disk boundary. This way, the SP does not have to split a frame.

The FC ASIC tells the SP through control frames the FC topology:
  loop/fabric/point2point.

In a loop topology, the FC ASIC goes through the Loop Initialization and provides the SP through a directed frame of the loop position map.

FC ASIC Sending a Write Command

A command descriptor will be sent to the SP. The SP will send a response back to the FC ASIC with the number of bytes it is willing to accept. This frame is referred to as a RDY frame. With the RDY frame, the SP will insert the SP handle. This SP handle should be used by the FC ASIC when sending data related to this command.

The FC ASIC will send data to the SP up to the amount specified in the response. The FC ASIC will attach the SP command handle with each data frame. This will allow the SP to associate the data frames with a particular command.

When the FC ASIC has finished sending data up to the amount specified in the RDY frame, the SP will send another RDY frame telling the FC ASIC the amount of data it is willing to accept. This will continue until the write command is complete. This mechanism is similar to the XFER_RDY used in Fibre Channel.

When the SP completes the write operation, it will send a STATUS response to the FC ASIC. After sending out the STATUS frame, the FC ASIC will generate an ACK frame to the SP to indicate the completed transaction. The SP will at this point free up its resources.

Frame ID Numbering

Frames may be dropped due to the lack of buffer resources or collisions. In order to detect this condition, the ACK/RDY, Data and Status frames have a frame id number.

The SP observes the frame ID from the FC ASIC and checks it to make sure that it is the expected value. The expected value is 1 more than the previous frame ID.

The FC ASIC similarly checks the SP frame ID to make sure that it is the expected value. The expected value is 1 more than the previous frame ID.

When the FC ASIC sends a READ Command to the SP, the SP will respond with Data Frames. The 1st Data Frame will have a frame ID number of 0, the 2nd Data Frame a frame ID of 1 and so on. Once data transfer is complete, the SP will send the Status Frame. The frame ID of this frame will be 1 more than the last Data Frame.

CRC Protection

In order to provide end-to-end data protection the FC ASIC will provide CRC over the FC Data in the data frames. The SP may or may not examine the CRC. It will just route the data frame including the CRC to the egress side. This is the DTCRC.

On the egress side, the SP will modify the headers and send the data frame to the FC ASIC. The FC ASIC will perform the CRC verification.

If there is an error, the FC ASIC will generate a Status frame indicating a CRC Failure.

On the positive side, the SP is not burdened with performing CRC calculations.

As will be understood by those with skill in the art, the present invention may be embodied in other specific forms without departing from the essential characteristics thereof. For example, a general purpose CPU could be used instead of a network processor in the SP of the described embodiment. Additionally, an internal streaming protocol other than POS could be used, such as Ethernet over SONET or SDH. Accordingly, the foregoing description is intended to be illustrative, but not limiting, of the scope of the invention which is set forth in the following claims.

What is claimed is:

1. A computing device comprising:
   protocol interface hardware logic configured to communicate data between an external host and an external storage device and is separate from a processor having a classifier coupled to the protocol interface hardware logic and a memory, wherein the protocol interface hardware logic is configured to:
   receive, from an external host, data in a first streaming protocol,
   inspect a frame of the received data in the first streaming protocol, determine a type of action for the received data, and insert a frame type code corresponding to the determined type of action into a header field of a frame of a second streaming protocol encapsulating at least a portion of the received data; and
   the processor having the classifier coupled to the protocol interface hardware logic and the memory and configured to execute programmed instructions stored in the memory to:
   receive, from a protocol interface hardware logic, the data encapsulated in the second streaming protocol, and direct the encapsulated data to the external storage device wherein the classifier is configured to read the frame type code in the header field of the frame of the second streaming protocol and assign the frame of the second streaming protocol to another processor based upon the frame type code.

2. The device of claim 1, wherein the classifier of the storage processor comprises a hardware classifier.

3. The device of claim 1, wherein the processor is configured to manage an address space of the external storage device.

4. The device of claim 3, wherein the processor is further configured to execute the programmed instructions to translate between virtual addresses used by the external host and physical addresses used by the external storage device.

5. The device of claim 1, wherein the classifier of the processor is further configured to:
   determine that the type code corresponds to a read or write operation; and
   assign the frame of the second streaming protocol to the another processor comprising a protocol processor based on determining that the type code corresponds to the read or write operation.

6. The device of claim 5, wherein the classifier of the processor is further configured to:
   determine that the type code corresponds to any operation other than read or write; and
   assign the frame of the second streaming protocol to the another processor comprising a general purpose processor based on determining that the type code corresponds to any operation other than read or write.

7. The device of claim 1, wherein a plurality of protocol interface hardware logic are coupled to the storage processor.

8. The device of claim 1, wherein the protocol interface hardware logic is further configured to inspect a header of a received frame of the first streaming protocol and identify contextual information and determine frame destination information using the contextual information, and wherein the another processor is further configured to route the frame of the second streaming protocol based on the frame destination information.

9. The device of claim 8, wherein the another processor comprises a plurality of protocol processors, wherein the another processor is further configured to route the frame of the second streaming protocol to a particular protocol processor of the plurality of protocol processors using the frame destination information.

10. The device of claim 8, further comprising:
    a storage controller configured to communicate the data between the external host and the external storage device and further configured to provide control of a plurality of physical storage devices comprising the external storage device, wherein the storage controller is configured to routes the frame of the second streaming protocol to the external storage device using the frame destination information.

11. The device of claim 8, wherein protocol interface hardware logic is configured to generate a descriptor from the frame destination information and to encapsulate the descriptor within the frame of the second streaming protocol encapsulating the portion of the received data, and wherein the processor is configured to use the descriptor to route the frame of the second streaming protocol.

12. The device of claim 11, wherein the memory further comprises:
a look up table correlating providing correlation between frame contextual information and the frame destination information, wherein the protocol interface hardware logic is further configured to use the look up table to determine the frame destination information using the contextual information.

13. The device of claim 12, wherein the protocol interface hardware logic is further configured to avoid buffering of an entire incoming frame of the first streaming protocol by using the look up table and the frame destination information.

14. A method comprising:
receiving, by a protocol interface hardware logic disposed in a communication path between an external host and an external storage device and that is separate from a processor having a classifier coupled to the protocol interface hardware logic and a memory, data frames from the external host in a first streaming protocol;
inspecting, by the protocol interface hardware logic, a frame received in the first streaming protocol;
determining, by the protocol interface hardware logic, a type of action for data of the received frame;
encapsulating, by the protocol interface hardware logic, at least a portion of the data of the received frame into a second streaming protocol;
inserting, by the protocol interface hardware logic, a frame type code corresponding to the determined type of action into a header field of a frame of the second streaming protocol encapsulating the portion of the received data;
receiving, by the processor, the frame of the second streaming protocol, wherein the processor includes one or more other processors;
reading, by the processor, the frame type code in the header field of the frame of the second streaming protocol; and
assigning, by the processor, the frame of the second streaming protocol to one of the other processors based upon the frame type code to thereby direct the data received from the protocol interface module in the second streaming protocol to the external storage device.

15. The method of claim 14, wherein the classifier of the processor comprises a hardware classifier.

16. The method of claim 14, further comprising:
managing, by the processor, an address space of the external storage device.

17. The method of claim 16, wherein the managing the address space comprises:
translating, by the processor, between virtual addresses used by the external host and physical addresses used by the external storage device.

18. The method of claim 14, wherein the assigning the frame of the second streaming protocol comprises:
determining, by the processor, that the type code corresponds to a read or write operation; and
assigning, by the processor, the frame of the second streaming protocol to the one of the other processors comprising a protocol processor based on determining that the type code corresponds to a read or write operation.

19. The method of claim 18, wherein the one of the other processors determines which virtual logical unit number is associated with the data in the frame having the type code corresponding to the read or write operation, wherein the method further comprises:
receiving, by the protocol interface hardware logic, an additional data frame from the external host in the first streaming protocol;
inspecting, by the protocol interface hardware logic, the additional data frame received in the first streaming protocol;
determining, by the protocol interface hardware logic, an additional type of action for data of the received additional data frame, wherein the additional type of action is not a read operation and is not a write operation;
encapsulating, by the protocol interface hardware logic, at least a portion of the data of the received additional data frame into the second streaming protocol;
inserting, by the protocol interface hardware logic, an additional frame type code corresponding to the determined additional type of action into an additional header field of an additional frame of the second streaming protocol that encapsulates the portion of the data of the received additional data frame;
receiving, by the processor, the additional frame of the second streaming protocol;
reading, by the processor, the additional frame type code in the additional header field of the additional frame; and
assigning, by the processor, the additional frame of the second streaming protocol to the one of the other processors based upon the additional frame type code corresponding to the determined additional type of action,
wherein the one of the other processors performs one or more operations other than determining which virtual logical unit number is associated with the data in the additional frame having the additional type code.

20. The method of claim 14, wherein the assigning the frame of the second streaming protocol further comprises:
determining, by the processor, that the type code corresponds to any operation other than read or write; and
assigning, by the processor, the frame of the second streaming protocol to the one of the other processors comprising a general purpose processor based on determining that the type code corresponds to any operation other than read or write.

21. The method of claim 14, further comprising:
identifying, by the protocol interface hardware logic, contextual information from an inspection of a header of a received frame of the first streaming protocol:
determining, by the protocol interface hardware logic, frame destination information using the contextual information; and
routing, by the one of the other processors, the frame of the second streaming protocol based on the frame destination information.

22. The method of claim 21, wherein the other processors comprise a plurality of protocol processors, and wherein the routing comprises: routing the frame of the second streaming protocol to a particular protocol processor of the plurality of protocol processors using the frame destination information.

23. The method of claim 21, wherein the routing comprises:

routing the frame of the second streaming protocol to a storage controller using the frame destination information.

24. The method of claim 21, further comprising:
generating, by the protocol interface hardware logic, a descriptor from the frame destination information; and
encapsulating the descriptor within the frame of the second streaming protocol encapsulating a portion of the received data, wherein the one of the other processors is configured to use the descriptor to route the frame of the second streaming protocol.

25. The method of claim 24, further comprising: correlating, by the protocol interface hardware logic, frame contextual information and the frame destination information using a look up table, wherein the protocol interface hardware logic uses the look up table to determine the frame destination information using the contextual information.

26. The non-transitory machine-readable medium of claim 24, wherein the machine-executable code wherein the protocol interface hardware logic:
correlated frame contextual information and the frame destination information using a look up table; and
used the look up table to determine the frame destination information using the contextual information.

27. A non-transitory machine-readable medium having stored thereon instructions for performing a method, the instructions comprising machine-executable code that, when executed by one or more machines, causes the one or more machines to:
receive a frame of a second streaming protocol, wherein protocol interface hardware logic disposed in a communication path between an external host and an external storage device and that is separate from a processor having a classifier coupled to the protocol interface hardware logic and a memory received data frames from an external host in a first streaming protocol, inspected a frame received in the first streaming protocol, determined a type of action for data of the received frame, encapsulated at least a portion of the data of the received frame into the second streaming protocol, and inserted a frame type code corresponding to the determined type of action into a header field of a frame of the second streaming protocol encapsulating the portion of the received data;
read the frame type code in the header field of the frame of the second streaming protocol; and
assign the frame of the second streaming protocol to one of one or more processors based upon the frame type code to thereby direct the data received in the second streaming protocol to the storage device.

28. The non-transitory machine-readable medium of claim 27, wherein the machine-executable code further comprises additional code that, when executed by the one or more machines, causes the one or more machines to:
manage an address space of the external storage device by translating between virtual addresses used by the external host and physical addresses used by the external storage device.

29. The non-transitory machine-readable medium of claim 27, wherein the assigning the frame of the second streaming protocol comprises:
determining that the type code corresponds to a read or write operation; and
assigning the frame of the second streaming protocol to the one of the one or more processors comprising a protocol processor based on determining that the type code corresponds to a read or write operation.

30. The non-transitory machine-readable medium of claim 27, wherein the assigning the frame of the second streaming protocol further comprises:
determining that the type code corresponds to any operation other than read or write; and
assigning the frame of the second streaming protocol to the one of the one or more processors comprising a general purpose processor based on determining that the type code corresponds to any operation other than read or write.

31. The non-transitory machine-readable medium of claim 27, wherein the machine-executable code further comprises additional code that, when executed by the one or more machines, causes the one or more machines to:
route the frame of the second streaming protocol based on frame destination information, wherein the protocol interface hardware logic identified contextual information from an inspection of a header of a received frame of the first streaming protocol and determined frame destination information using the contextual information.

32. The non-transitory machine-readable medium of claim 31, wherein the one or more protocol processors comprise a plurality of protocol processors, and wherein the routing comprises:
routing the frame of the second streaming protocol to a particular one of the one or more processors using the frame destination information.

33. The non-transitory machine-readable medium of claim 31, wherein the routing comprises:
routing the frame of the second streaming protocol to a storage controller using the frame destination information.

34. The non-transitory machine-readable medium of claim 31, wherein the machine-executable code further comprises additional code that, when executed by the one or more machines, causes the one or more machines to:
encapsulate a descriptor within the frame of the second streaming protocol encapsulating the portion of the received data, wherein the one of one or more processors is configured to use the descriptor to route the frame of the second streaming protocol and wherein the protocol interface hardware logic generated a descriptor from the frame destination information.

* * * * *